United States Patent [19]

Geithman et al.

[11] Patent Number: 4,564,810

[45] Date of Patent: Jan. 14, 1986

[54] ALUMINUM CLADDING THICKNESS MEASUREMENT PROBE AND INSTRUMENT HAVING AN AUTOMATIC CALIBRATION AND READOUT CIRCUIT COUPLED TO A DIFFERENTIAL AMPLIFIER CIRCUIT

[75] Inventors: Glenn A. Geithman, Renton; Albert W. Chau, Redmond, both of Wash.

[73] Assignee: The Boeing Company, Seattle, Wash.

[21] Appl. No.: 530,447

[22] Filed: Sep. 8, 1983

Related U.S. Application Data

[62] Division of Ser. No. 307,037, Sep. 30, 1981.

[51] Int. Cl.[4] ........................ G01B 7/10; G01R 33/12; G01R 35/00; G01N 27/72
[52] U.S. Cl. .................................... 324/230; 324/202; 324/236
[58] Field of Search ............... 324/229, 230, 231, 202, 324/238, 225, 236

[56] References Cited

U.S. PATENT DOCUMENTS

| | | | |
|---|---|---|---|
| 2,933,677 | 4/1960 | Lieber | 324/230 |
| 3,495,196 | 2/1970 | Lorenzi et al. | 324/238 |
| 4,247,818 | 1/1981 | Hiroshima et al. | 324/202 |

*Primary Examiner*—Gerard R. Strecker
*Assistant Examiner*—Walter E. Snow
*Attorney, Agent, or Firm*—Conrad O. Gardner; Bernard A. Donahue; Nicolaas DeVogel

[57] ABSTRACT

A system for measuring the cladding thickness on aluminum sheets which includes a cylindrical probe holder with four evenly spaced contact points surrounding a low temperature coefficient torroidal ferrite core which provides a signal to an aluminum cladding thickness signal processing circuit comprising a crystal oscillator, low drift detector, and push button calibration instrument portion thereby enabling drift free repeatable measurements.

2 Claims, 5 Drawing Figures

ALUMINUM CLADDING THICKNESS MEASUREMENT PROBE AND INSTRUMENT HAVING AN AUTOMATIC CALIBRATION AND READOUT CIRCUIT COUPLED TO A DIFFERENTIAL AMPLIFIER CIRCUIT

This is a division, of application Ser. No. 307,037, filed Sept. 30, 1981.

The present invention relates to methods and apparatus for measuring the cladding thickness of aluminum on aluminum alloy sheets utilized in aircraft skins and more particularly to cladding thickness measuring apparatus for aluminum alloy sheets which apparatus minimizes drift due to thermal variations in the probe and measuring system.

In the patent literature, U.S. Pat. Nos. 2,887,651 and 2,920,268 show the use of electromagnetic coils employed in instruments for determining the thickness of metallic and nonmetallic surfaces applied on substrate or support materials. The use of torroidal cores in thickness gages has been shown in the patent literature; e.g., in German Pat. No. 883,657 and Russian Pat. No. 129,022.

Aluminum alloy sheets used on aircraft skins are often cladded with pure aluminum in an effort to retard corrosion. The thickness of this cladding may vary from less than 0.001 inches to over 0.005 inches, depending on the thickness of the skin. During assembly these parts are often scratched which requires that the defective area be repaired and polished. The question then arises as to how much, if any, of original cladding remains.

A currently used method for determining clad thickness (in the factory) involves the use of a chemical spot test. Unfortunately, this technique is both destructive and non-quantitative.

Conductivity tests involving high frequency eddy current instruments have been utilized in the past with only limited success. Instruments of this type have depended upon the fact that pure aluminum has about half the electrical resistivity of the typical base metal alloy. In such instruments, a probe containing an inductor is brought into contact with the surface of the part. The probe is usually one element of an AC bridge circuit and is excited with a high frequency signal on the order of 1 mHz. Such high frequencies cause eddy currents to be generated only near the surface (top few mils.) of the part due to the "skin" effect. The device can then be calibrated to read clad thickness. The primary difficulty with such method and apparatus is due to probe lift off effects caused by surface roughness and curvature of the part under test, thereby leading to very erroneous indications. A further disadvantage of the prior art instruments is the fact that most commercial eddy current instruments have numerous controls, i.e., gain and balance adjustments, etc., which render them difficult in use. Such instruments also exhibit considerable drift due to thermal variations in the probe and electronics signal processing portion of the system.

Accordingly it is an object of the present invention to provide a system for measuring cladding thickness on aluminum sheets which exhibits negligible drift due to thermal variations in the probe and electronics.

It is another object of the present invention to provide a small contact area eddy current probe for coupling to a signal processing circuit for indicating cladding thickness of aluminum sheets.

It is yet another object of the present invention to provide probe means in an electronic cladding measurement system which probe has only one stable orientation on a curved surface, such that the axis of the probe is orthogonal, thereby minimizing lift off arising from the tilt of the probe.

The invention will be best understood by reference to the accompanying drawings illustrative of an exemplary embodiment of the method and apparatus, wherein.

Figure 1:
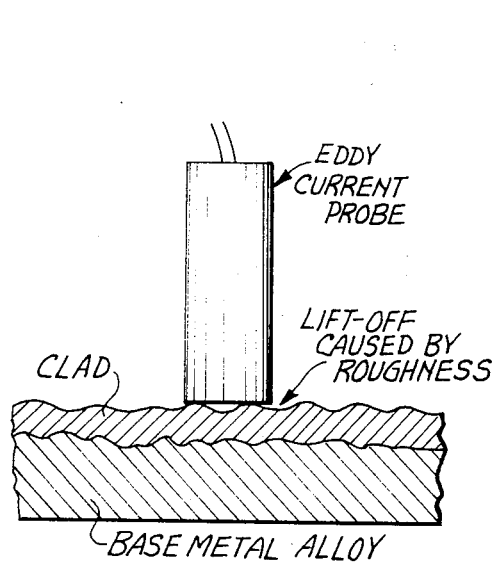
FIG. 1 is a view of a prior art eddy current probe showing lift off measurement problems associated with roughness of the cladding coating.
Figure 2:
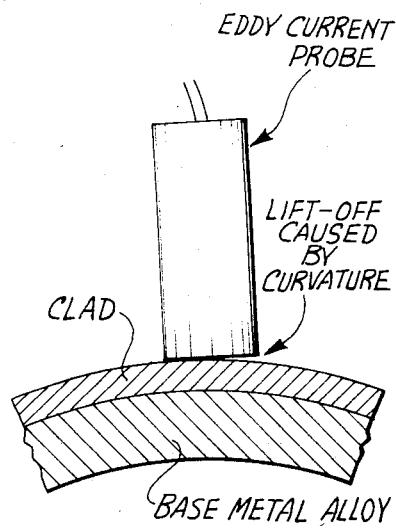
FIG. 2 is a prior art showing of eddy current probe measuring problems caused by lift off due to curvature of the cladding surface.

Turning now to FIGS. 1 and 2, an eddy current probe is seen which contains an inductor and which is normally brought into contact with the cladding surface of the part to be measured. The probes of FIGS. 1 and 2 are normally one element in the prior art of an AC bridge circuit which is excited with a high frequency signal on the order of 1 mHz. As known, such high frequencies cause eddy currents to be generated only near the surface of the part due to the skin effect. Calibration of these devices is made to read clad thickness. The primary difficulty as can be observed in FIGS. 1 and 2, is due to probe lift off effects caused by surface roughness as shown in FIG. 1 and surface curvature as shown in FIG. 2 of the part under test. These techniques with the prior art probe can often result in very erroneous indications.

Figure 3:
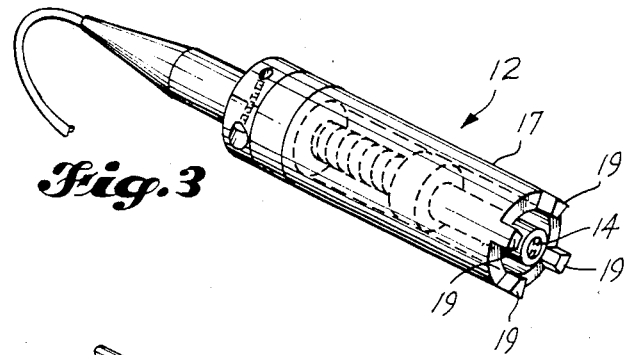
FIG. 3 is a perspective view of the present eddy current probe assembly.
Figure 4:
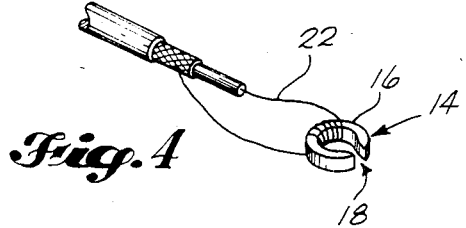
FIG. 4 is a detailed showing of the inductor arrangement used in the probe assembly of FIG. 3.

Eddy current probe 12 shown in FIG. 3 in accordance with a preferred embodiment of the present invention, has a very small area contact rather than an extended surface of the type shown above in FIGS. 1 and 2. Probe 12 has an inductor with a low temperature coefficient torroidal ferrite core 14 as shown in FIG. 3, and shown in more detail in FIG. 4. Low temperature coefficient torroidal ferrite core 16 as seen in FIG. 4 has a diameter of about 0.125 inches. An air gap 18 is cut in the torroid 16 resulting in a fringing magnetic field providing a small contact area such that lift off due to surface roughness and curvature is reduced in the present system. Probe 12 as seen in FIG. 3 comprises a surrounding cylindrical tube-shaped member 17 terminating in four evenly spaced contact points 19 at one end thereof. Probe 12, is thus seen to have only one stable orientation on a curved surface, such that the axis of the probe is orthogonal. This probe configuration minimizes lift off resulting from the tilt of the probe.

Figure 5:
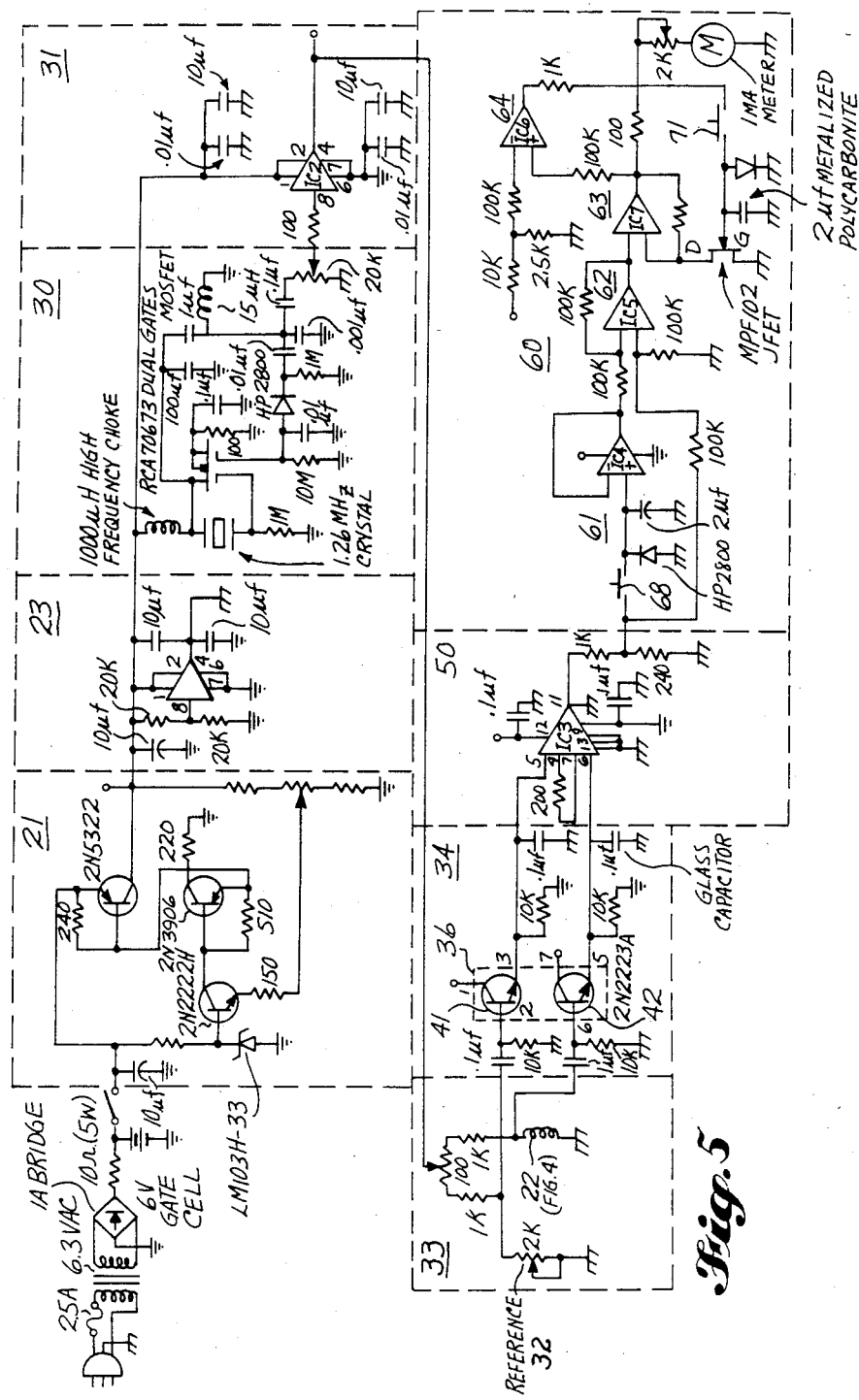
FIG. 5 is a schematic diagram of the signal processing circuit.

Turning now to FIG. 5 and a schematic circuit diagram of the present signal processing circuit for measuring cladding thickness on aluminum sheets, it can be observed that to achieve low drift and repeatability, a crystal controlled low distortion sine wave oscillator circuit 30 with feed back amplitude control is utilized. The signals from inductor 22 shown in FIG. 4 and a reference voltage 32 are differentially amplified, the signal then being fed to detector circuit 34. Detector circuit 34 includes two matched NPN transistors 41 and 42 on the same substrate 36. Matched transistor 42 is utilized as an emitter follower with its base biased at ground potential and with an emitter resistor connected to a minus supply voltage. This ensures that the follower will only source current and charge up the hold capacitor when the signal from the differential amplifier swing positive with respect to ground. Further transistor 41 is connected in the same manner, except it does not receive any other drive from the signal, so it serves as a reference of a base-emitter voltage, which varies about 3 mv/°C. The signals from the emitters are again differentially amplified in differential amplifier circuit 50 and coupled downstream to autocalibration and readout circuit 60. Autocalibration and readout circuit 60 includes sample and hold circuit 61, and differential amplifier circuit 62 allowing one button 68 zeroing of the meter over different alloys of aluminum. Further one button switch autocalibration is provided at 71. The voltage provided to oscillator circuit 30 is shown to include coupling from the power source of a low overhead voltage regulator circuit 21 and a power splitter circuit 23 which are coupled downstream to a 1.26 MHz crystal oscillator circuit 30. Oscillator circuit 30 is a low distortion frequency stable circuit with amplitude feedback to achieve amplitude stability. Oscillator circuit 30 is coupled through buffer and driver circuit 31 to bridge circuit 33. Bridge circuit 33 includes test probe inductor 22 which surrounds torroidal ferrite core 16 as seen in FIG. 4 and, reference voltage 32. Detector circuit 34 hereinbefore mentioned includes peak detectors with thermal-tracking, and is coupled through differential instrumentation amplifier circuit 50 to autocalibration and readout circuit 60.

The combination of crystal oscillator circuit 30, low drift detector circuit 34 and push-button calibration as provided in autocalibration and readout circuit 60 results in signal processing from the test probe which is both relatively drift free and easy to utilize in the field in contrast to the above-mentioned systems of the prior art.

With regard to parts of the signal processing circuit for measuring cladding thickness on aluminum sheets shown in the preferred embodiment of FIG. 5, all resistors except the 10 ohm (5 watts) power resistors, are one-fourth watt metal film resistors. IC1 and IC2 comprise type LH0002CH current amplifiers manufactured by National Semiconductor Corporation. IC3 comprises a type LH0036CG instrumentation amplifier, also manufactured by National Semiconductor Corporation. IC4, IC5, IC6, IC7, are one-fourth of type TL064B low-power operational amplifiers.

What is claimed is:

1. A cladding thickness measuring signal processing circuit comprising in combination:
   a power supply circuit coupled to a voltage regulator circuit;
   a low distortion, frequency stable 1.26 MHz oscillator circuit having amplitude feedback for providing amplitude stability;
   a power splitter circuit coupled between said voltage regulator circuit and said low distortion, frequency stable oscillator circuit;
   a bridge circuit including a test probe input terminal;
   a buffer and driver circuit coupled between said low distortion, frequency stable oscillator circuit and said bridge circuit;
   a differential amplifier circuit;
   a detector circuit having peak detectors with thermo-tracking, said detector circuit coupled between said differential amplifier circuit and said bridge circuit; and,
   an automatic calibration and readout circuit coupled to said differential amplifier circuit.

2. The invention according to claim 1 wherein said automatic calibration and readout circuit includes:
   a sample and hold circuit coupled to a further differential amplifier circuit;
   a readout meter;
   a scaling circuit coupled between said differential amplifier circuit and said readout meter; and,
   a voltage comparator circuit coupled to said scaling circuit.

* * * * *